(12) United States Patent
Baumann et al.

(10) Patent No.: US 6,706,181 B1
(45) Date of Patent: Mar. 16, 2004

(54) LIQUID FILTER, ESPECIALLY AN OIL FILTER

(75) Inventors: Peter Baumann, Stuttgart (DE); Thomas Brieden, Waiblingen (DE); Hans Gebert, Heilbronn (DE); Benoit Monzie, Stuttgart (DE); Uwe Grass, Stuttgart (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 0 days.

(21) Appl. No.: 10/111,473

(22) PCT Filed: Sep. 30, 2000

(86) PCT No.: PCT/DE00/03509

§ 371 (c)(1),
(2), (4) Date: Apr. 23, 2002

(87) PCT Pub. No.: WO01/30480

PCT Pub. Date: May 3, 2001

(30) Foreign Application Priority Data

Oct. 23, 1999 (DE) .......................... 199 51 085

(51) Int. Cl.[7] .................. B01D 35/31; B01D 35/34
(52) U.S. Cl. .............. 210/236; 210/248; 210/428; 210/433.1; 210/440; 210/454
(58) Field of Search ................. 210/236, 248, 210/428, 433.1, 440, 443, 444, 454

(56) References Cited

U.S. PATENT DOCUMENTS 4,654,141 A  3/1987  Frentzel
5,698,098 A * 12/1997  Ernst et al. ............. 210/248
5,814,215 A   9/1998  Jensen et al.

FOREIGN PATENT DOCUMENTS

| DE | 35 38 589 | 5/1987 |
| DE | 39 03 675 | 8/1990 |
| DE | 39 33 794 | 4/1991 |
| EP | 0 874 140 | 10/1998 |

* cited by examiner

Primary Examiner—Matthew O. Savage
(74) Attorney, Agent, or Firm—Collard & Roe, P.C.

(57) ABSTRACT

The invention relates to a liquid filter, especially an oil filter, for cleaning lubricating oil, especially for internal combustion engines of automobiles, comprising an upright filter housing which contains a receiving area for a ring-shaped filter insert that is inserted into said receiving area, an inlet channel for unclean liquid, an outlet for clean liquid, and an additional discharge channel which is exposed when the ring-shaped filter insert is removed. An eccentrically projecting pin is moulded to a lower end plate and sealingly penetrates an opening of the discharge channel when the ring-shaped filter insert is introduced into the filter housing. According to the invention, a ramp is configured on the floor of the receiving area and is positioned in such a way that when the ring-shaped filter insert is introduced into the filter housing, the pin lies on said ramp and when the ring-shaped filter insert is rotated about its longitudinal axis, the pin slides downwards along the ramp and enters the opening of the discharge channel at the lower end of the ramp. This improves handling.

24 Claims, 6 Drawing Sheets

LIQUID FILTER, ESPECIALLY AN OIL FILTER

CROSS REFERENCE TO RELATED APPLICATIONS

Applicants claim priority under 35 U.S.C. §119 of German Application No. 199 51 085.7 filed Oct. 23, 1999. Applicants also claim priority under 35 U.S.C. §120 of PCT/DE00/03509 filed Sep. 30, 2000. The international application under PCT article 21(2) was not published in English.

This invention relates to a liquid filter, especially an oil filter, for cleaning lubricating oil, especially for internal combustion engines in motor vehicles, having the features of the definition of the species of claim 1.

German Patent 39 03 675 C2 describes an oil filter of this type, having a filter housing arranged essentially upright in the installed state and containing a receiving area for a ring-shaped filter insert inserted into it for filtering the oil. The filter housing is also equipped with an inlet for the unclean oil which flows around the ring-shaped filter insert. In addition, an outlet for the cleaned oil is also provided and is connected to a central inside area of the filter housing and is accommodated in a bottom on the lower end of the receiving area. The known oil filter is also equipped with an additional discharge channel out of the receiving area, provided on the bottom of the receiving area. A pin extending parallel to the longitudinal axis of the ring-shaped filter insert and projecting eccentrically thereto is molded onto a lower end disk of the ring-shaped filter insert; when the ring-shaped filter insert is inserted into the filter housing, the pin penetrates through an opening in the discharge channel and seals it. Such a discharge channel is needed to empty the receiving area for changing the ring-shaped filter insert, thus reducing the risk of soiling. With the known oil filter, when the ring-shaped filter insert is removed, the discharge channel is automatically released, so that the oil in the receiving area can flow out, preferably into an oil pan.

The known oil filter has positioning means which guarantee that the ring-shaped filter insert is always positioned relative to the filter housing on insertion of the ring-shaped filter insert so that the pin penetrates axially into the opening in the discharge channel. A web which projects radially inward and extends axially is formed on the inside wall of the filter housing, where it serves as a positioning means, engaging in a radial slot formed on the outside circumference of the lower end disk of the ring-shaped filter insert. The problem here is that threading the web into the radial slot requires careful handling.

The present invention is concerned with the problem of designing a filter of the type defined above so that insertion of the ring-shaped filter insert is simplified.

This problem is solved according to this invention by a liquid filter, especially an oil filter, for cleaning lubricating oil, especially having the features of claim 1.

This invention is based on the general idea of arranging an insertion aid on the bottom of the receiving area to ensure that the pin will always find the opening in the discharge channel on insertion of the ring-shaped filter insert, regardless of the relative initial position of the ring-shaped filter insert with respect to the filter housing. As an insertion aid, a ramp is proposed, so that the pin always encounters the ramp on axial insertion of the ring-shaped filter insert if the pin is not aligned with the opening in the discharge channel. The ramp drops in the direction of the opening in the discharge channel so that the pin slides along the ramp to reach the opening at the lower end of the ramp. The ring-shaped filter insert is designed specifically so that the pin is able to slide along the ramp. First, special contact zones which permit sliding may be formed on the pin as well as the ramp. Second, the ring-shaped filter insert is designed so that it can rotate freely about its longitudinal axis in the receiving area of the filter housing.

According to a special embodiment, the ramp may be designed to be helical and it may have an essentially complete winding, so that then an upper end of the ramp is adjacent to the opening in the discharge channel. Accordingly, the lower end of the ramp is located on one side at the opening in the discharge channel and on the other side is the upper end of the ramp, with an inclined flank optionally being formed between the opening and the upper end of the ramp. If the filter housing has a cover which can be screwed onto the filter housing to close it, the ramp drops toward the opening in the discharge channel in the direction of screwing on the cover. This measure guarantees that screwing on the cover will support the pin sliding along the ramp.

According to another especially advantageous embodiment, a guide contour may be formed at least in a section of the ramp containing the lower end of the ramp next to the contact zone of the ramp radially, said contour projecting axially beyond the contact zone of the ramp toward the receiving area. This measure makes it possible to implement a radial guide for the pin sliding along the ramp, thus making it simpler for the pin to find the opening in the discharge channel. The risk of the ring-shaped filter insert becoming skewed radially in the filter housing on insertion of the ring-shaped filter insert is thus reduced. Radial manufacturing tolerances can also be equalized due to the proposed guide contours.

Two radially opposed guide contours are preferably provided, with the contact zone of the ramp running between them. In addition, these guide contours may also have an insertion flank on an end facing away from the opening in the discharge channel. The proposed measures produce an improved radial guidance of the pin.

According to an advantageous embodiment, a projection extending axially away from the pin may be designed on an end of the pin facing the ramp, the free end axially forming the contact zone of the pin. As a result of this measure, the contact zones that work together can be optimized in an especially simple manner, thus achieving an especially low adhesive and sliding friction between the pin and the ramp. This improves sliding of the pin along the ramp and thus reliable threading of the pin into the opening in the discharge channel.

The projection is preferably thinner in at least one axially free end area in the radial direction than the radial distance between two radially opposed guide contours, and in particular the projection is longer in the axial direction in the axial distance between the contact zone of the ramp and an upper end of the guide contours. In this embodiment, the radial guidance by the guide contours can be implemented by a cooperation with the axial projection on the pin, so that only a reduced amount of space is needed for the ramp.

In another embodiment of this invention, the pin may be mounted flexibly on the end disk. Through this measure, radial manufacturing tolerances in the manufacture of the filter housing can be equalized. There is automatically an equalization of tolerance in the circumferential direction due to the free rotatability of the ring-shaped filter insert.

To improve sliding of the pin along the ramp, a tapering end section having the contact zone of the pin may be formed on the axially free end of the pin. In this way, a small area (in comparison with the cross section of the pin at the beginning of the end section) can be created especially easily as the contact zone of the pin on in particular a spot-shaped or linear contact zone may be created.

In a refinement of this invention, in order for the pin to be able to overcome obstacles such as soiling, deposits, etc, as it slides along the ramp, it is adjustably mounted on the end disk and/or the ring-shaped filter insert is adjustably mounted on the cover, and in particular it is under a spring bias toward the ramp.

In a preferred embodiment of this invention, the filter housing may be closed with a screw-on cover, and restraining devices are provided for mounting the ring-shaped filter insert on the cover in such a way that it is rotatable about its longitudinal axis and is secured axially. These restraining devices have catch hooks which extend essentially axially and are flexible radially. In addition, the restraining device also include a radially projecting ring-shaped shoulder on which the catch hooks are engaged when the ring-shaped filter insert is placed onto the cover. The upper end disk has a central orifice on the edge of which are arranged a gasket and an axially protruding ring-shaped collar. In addition, an axially protruding central ring is also mounted on the cover, said ring being arranged coaxially with the ring-shaped collar when the ring-shaped filter insert is placed on the cover, with the gasket forming a seal radially between the ring an the ring-shaped collar. This forms an especially inexpensive plug-in connection between the ring-shaped filter insert and the housing cover, forming an effective seal between the inside and the outside of the ring-shaped filter insert at the same time.

Other important features and advantages of the device according to this invention are derived from the subclaims, the drawings and the respective description of the figures on the basis of the drawings.

It is self-evident that the features mentioned above and those to be explained below can be used not only in the respective combination indicated, but also in any other combinations or alone without going beyond the scope of the present invention.

Preferred embodiments of this invention are illustrated in the drawings and explained in greater detail in the following description.

They show the following, each in the form of schematic diagrams.

Figure 1:
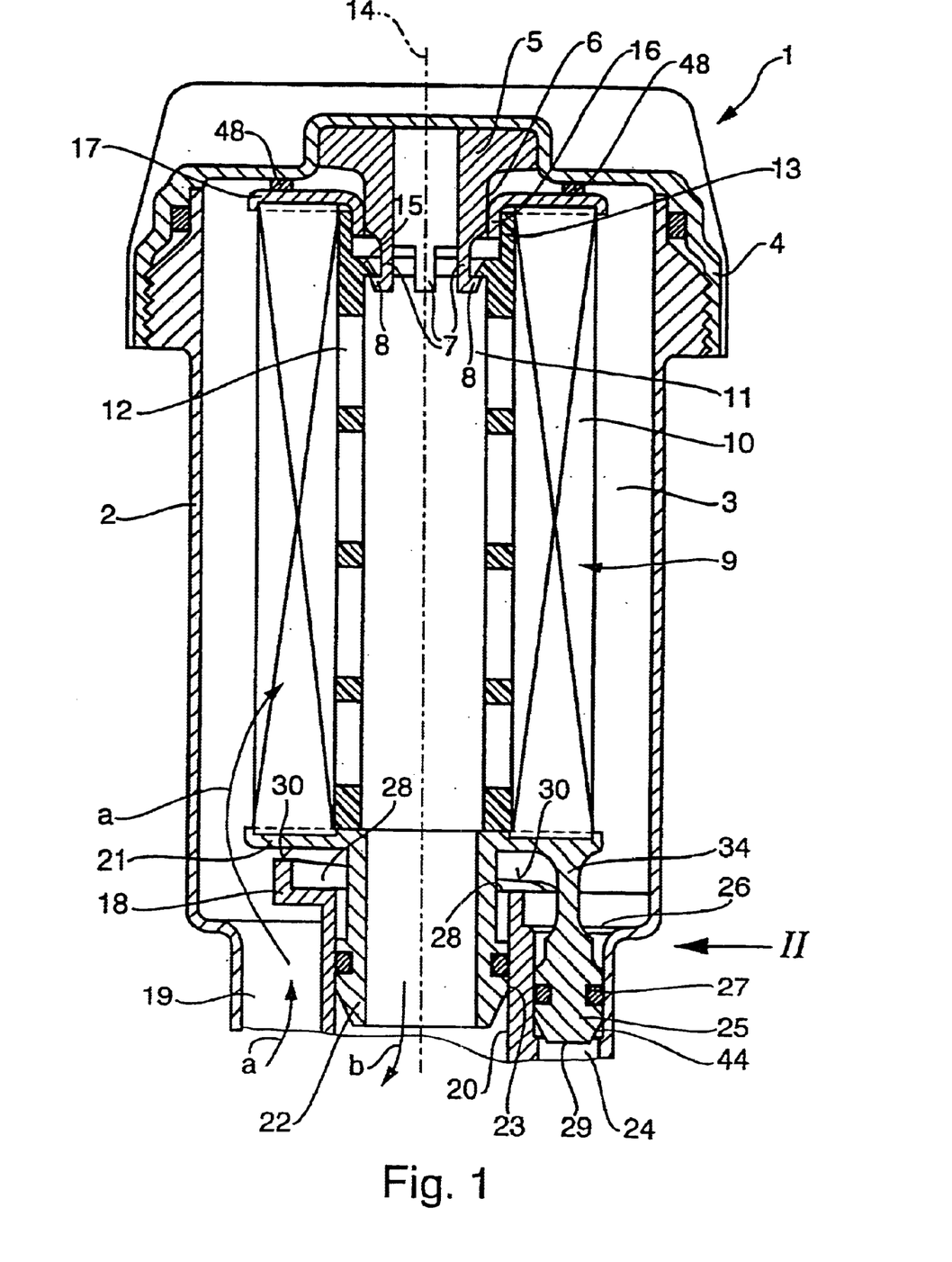
FIG. 1 a longitudinal section through a filter housing.

According to FIG. 1, a liquid filter 1 according to this invention has a filter housing 2 which is mounted in an essentially upright position in the installed state and includes a receiving area 3. The filter housing 2 is sealed tightly on its top side with a screw-on cover 4. A holder 5 mounted on the inside of the cover 4 has a central ring 6 and catch hooks 7 protruding axially from it. The catch hooks 7 are equipped with a catch nose 8 projecting radially outward and they are designed with radial flexibility.

A ring-shaped filter insert 9 inserted into the receiving area 3 of the filter housing 2 has a filter material 10 arranged in the form of a ring. The ring-shaped filter insert 9 has an inner frame 12 equipped with radial passages and the filter material 10 can be supported on this frame from the outside. At the upper end of inner frame 12 is formed a ring-shaped collar 13 which extends coaxially with a longitudinal axis 14 of the filter housing 2 or the ring-shaped filter insert 9. Adjacent to the ring-shaped collar 13 on the inside axially, a ring-shaped shoulder 15 is formed, projecting inward radially and working together with the catch hooks 7. With the ring-shaped filter insert 9 placed on the cover 4, the noses on the catch hooks 7 may engage in a form-fitting manner on the ring-shaped shoulder 15. In this way, the ring-shaped filter insert 9 is secured axially on the cover 4 while also being mounted so that it can rotate freely about its longitudinal axis.

The positioning of the ring 6 of the cover 4 and the ring-shaped collar 13 of the inner frame 12 are selected so that the ring 6 and the ring-shaped collar 13 overlap radially in an axial section when the ring-shaped filter insert 9 is engaged on the cover 4. A gasket 16 is arranged between the ring 6 and the ring-shaped collar 13 in contact with both the ring 6 and the ring-shaped collar 13 and sealing it. Due to the gasket 16, the receiving area 3 is sealed with respect to an interior space 11 of the ring-shaped filter insert 9 at the upper end of the ring-shaped filter insert 9.

In the present embodiment, the gasket 16 is formed by a ring-shaped sealing element which projects radially inward through a central axial orifice in the ring-shaped filter insert 9 and is bent toward the interior space 11 of the ring-shaped filter insert 9 when the ring-shaped filter insert 9 is placed on the cover 4. This is associated with compression of the sealing material, which thus supports the sealing effect. In a preferred embodiment of this invention, an upper end disk 17 of the ring-shaped filter insert 9 may be made of a sealing material, e.g., a nonwoven, and may be joined to the filter material 10 by plastification. The gasket 16 is thus manufactured in one piece with the upper end disk 17.

At the lower end of the filter housing 2, the receiving area 3 is delimited by a bottom 18. An inlet 19 for unclean liquid to be cleaned is located in the bottom 18, so that the liquid flows radially outward into the receiving area 3 and flows around the ring-shaped filter insert 9 on the outside. The direction of influx is symbolized by arrows a. An outlet 20, which is in the form of a socket receptacle here, is arranged centrally in the bottom 18. In the embodiment illustrated in FIG. 1, a coaxial connection 22 is formed on a lower end disk 21 of the ring-shaped filter insert 9, projecting axially into the outlet 20 and sealing it with a ring gasket 23. The outlet 20 communicates with the interior space 11 of the ring-shaped filter insert 9 through the connection 22, so that cleaned liquid can flow out of the filter 1 through the outlet 20 according to an arrow b.

In the bottom 18, there is also an additional discharge channel 24, which in turn communicates with an oil pan (not shown) on the one hand and with the receiving area 3 on the other hand. When the ring-shaped filter insert 9 is inserted into the filter housing 2, the discharge channel 24 is sealed by a pin 25 which projects axially into the discharge channel 24 through an opening 26 in it, with appropriate sealing means, here an O-ring 27, being provided to seal the discharge channel 24. The pin 25 is attached to the lower end disk 21 or is manufactured in one piece with it. This guarantees that when the ring-shaped filter insert 9 is pulled out of the filter housing 2, the discharge channel 24 is opened at the same time or promptly thereafter by extracting the pin 25, so that the receiving area 3 can be emptied.

A ramp 28 is provided on the bottom 18 of the receiving area 3, beginning with a lower end at the opening 26 in the discharge channel 24 opening 26 at the level of the bottom 18. Starting from this lower end, the ramp 28 rises with an increasing ramp length into the interior space of the receiving area 3. The ramp 28 forms an insertion aid for the pin 25 in the interior of the filter housing 2 to facilitate locating the opening 26.

The user inserts the ring-shaped filter insert 9 into the receiving area 3. If the pin 25 does not coincidentally become aligned axially with the discharge channel 24, the pin 25 will strike the ramp 28 and will rest on it. When cover 4 is screwed on, a force acting axially downward is transferred from the cover 4 to the ring-shaped filter insert 9. A contact zone 29 on the pin 25 facing the ramp 28 as well as a contact zone 30 facing the pin 25 are coordinated with one another with regard to their coefficient of friction on the ramp 28, so the pin 25 may slide down along the ramp due to the axial force acting downward. At the lower end of the ramp 28, the pin 25 then automatically finds the opening 26 in the discharge channel 24.

Figure 2:
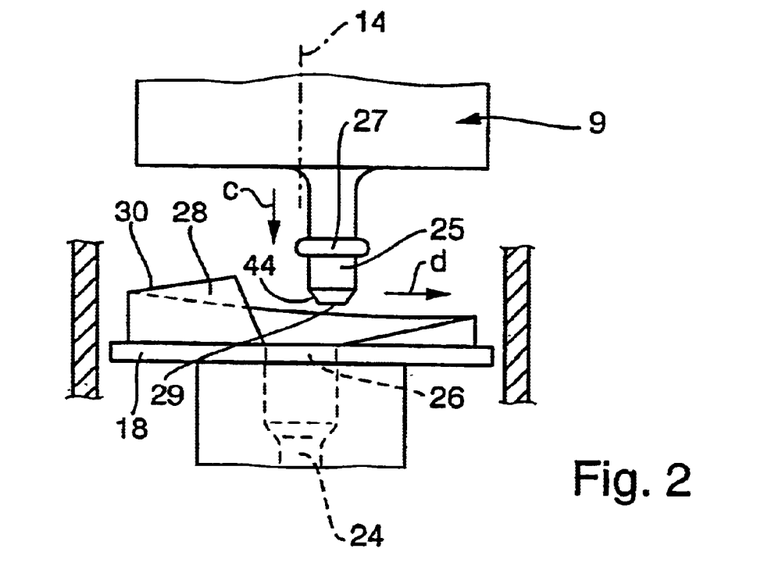
FIG. 2 a partially cut-away side view according to arrow II in FIG. 1.

According to FIG. 2, the ramp 28 is designed in the form of a screw with approximately one turn, for example, so that an upper end of the ramp 28 is in proximity to the opening 26 in the discharge channel 24. FIG. 2 also shows clearly that the axial force acting downward, represented here by an arrow c, results in a rotation of the ring-shaped filter insert 9 about its longitudinal axis 14. Rotation of the ring-shaped filter insert 9 then occurs due to the pin 25 sliding along the ramp 28 according to the arrow d. The ramp 28 is preferably designed so that it drops toward the bottom 18 in one direction of rotation, namely clockwise in this case, which corresponds to the direction of rotation of the cover 4 when screwed onto the housing 2 to seal it. In this way, a torque possibly transmitted to the ring-shaped filter insert 9 in screwing on the cover 4 can support the sliding of the pin 25 along the ramp 28.

Figure 3:
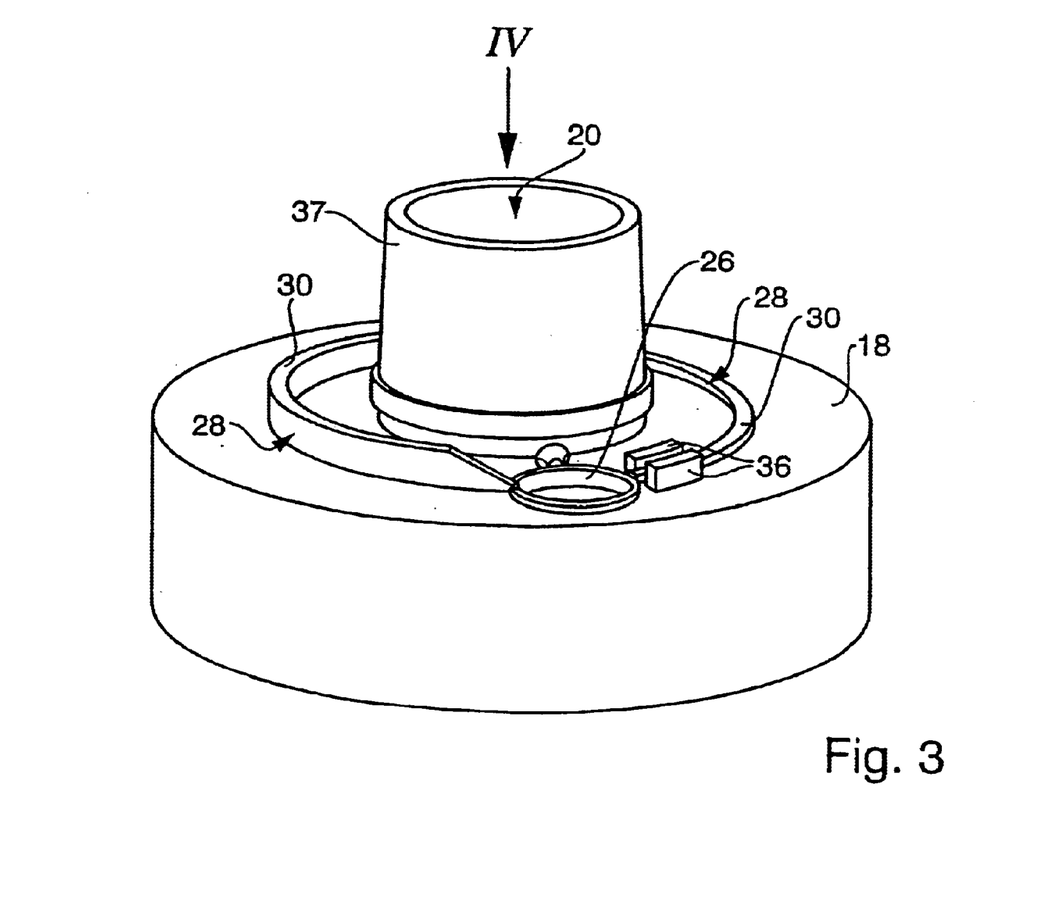
FIG. 3 a perspective view of a bottom in the filter housing having a ramp arranged in it according to another embodiment, FIG. 4 a top view of the bottom in FIG. 3 according to an arrow IV in FIG. 3, FIG. 5 a detailed view according to sectional line V in FIG. 4 with pin sliding along the ramp, FIG. 6 a view like that in FIG. 4, but showing another embodiment, FIG. 7 a longitudinal section through a section of an end disk with the pin mounted on it according to another embodiment, FIG. 8 a longitudinal section like that in FIG. 7, but of another embodiment, FIG. 9 a longitudinal section through a ring-shaped filter insert according to a special embodiment, FIG. 10 a longitudinal section through a partial area of a ring-shaped filter insert according to another embodiment, and FIG. 11 a view like that in FIG. 10, but showing another embodiment.

According to FIGS. 3 through 6, one guide contour 36 may be formed in the area of the lower end of the ramp 28, i.e., radially inward and outward in the case of the ramp end adjacent to the opening 26 in the discharge channel 24 at the right in FIG. 3, with this guide contour extending parallel to the contact zone 30 of the ramp 28 formed on the top side of the ramp 28 and extending radially next to it. The guide contours 36 form a radial lateral guide for the pin 25 sliding along the ramp 28, but the interaction of the guide contours with the pin 25 is explained in greater detail below in conjunction with FIG. 5.

The ramp 28 and/or the guide contours 36 are preferably designed with dimensions such that the lower end disk 21 rests on the highest point on the ramp 28 and/or on the guide contours 36 when the cover 4 is completely screwed on.

In the embodiment according to FIG. 3, a connection 37 projecting axially into the interior space is also formed on the bottom 18, connecting the outlet 20 to the interior space 11 of a ring-shaped filter insert 9 placed on it.

Figure 5:
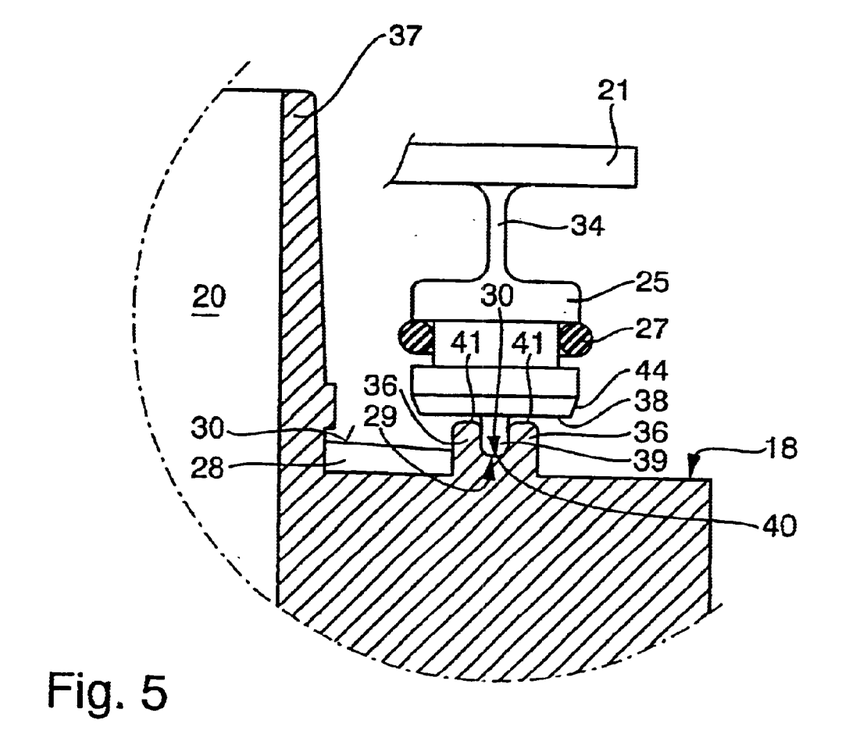

According to FIG. 5, a projection 39 is designed on an axially free projecting end 38 of the pin 25, projecting in the axial direction from the end 38 of the pin 25. The projection 39 may be designed in the form of a rib extending in the circumferential direction or in the form of a pin. An axially free end 40 of the projection 39 forms the contact zone 29 of the pin 25.

In the specific embodiments illustrated in FIGS. 3 through 6, the radial dimension, i.e., the thickness of the projection 39 is on the one hand smaller than the radial width of the contact zone 30 of the ramp 28 and is thus on the other hand also smaller than the radial distance between the radially opposite guide contours 36. The projection 39 thus has radial play between the guide contours 36. In addition, the axial length of the projection 39 is greater than the axial distance between the contact zone 30 of the ramp 28 and an upper end 41 of the guide contours 36. Due to this dimensioning, a contact of the axial end 38 of the pin 25 with the upper end 41 of the guide contours 36 is prevented. The sliding behavior of the pin 25 along the ramp 28 can be optimized through the special adaptation of the pin 25 to the ramp 28. At the same time, this yields a secure radial guidance of the pin 25.

Figure 4:
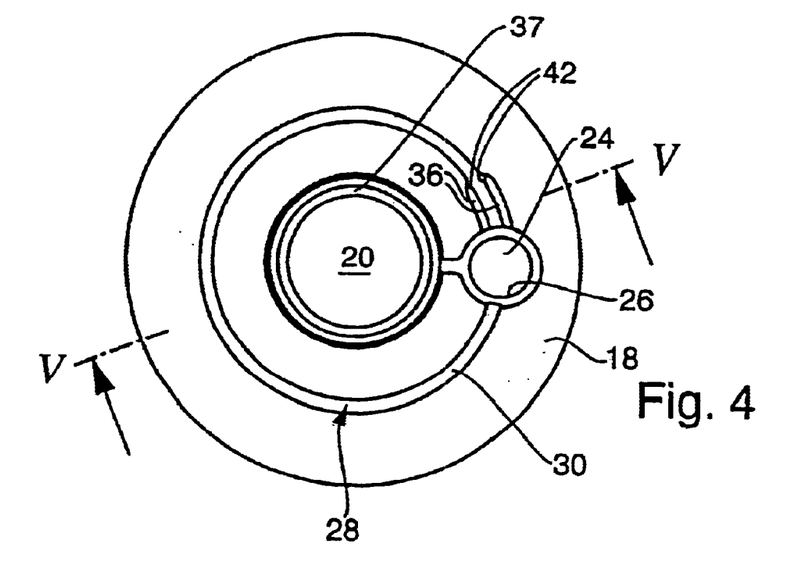

In contrast with the embodiment illustrated in FIG. 4, the contact zone 30 of the ramp 28 may also have a wider dimension outside the guide contours 36 in the radial direction, so that larger tolerances can be compensated in the radial direction.

Figure 6:
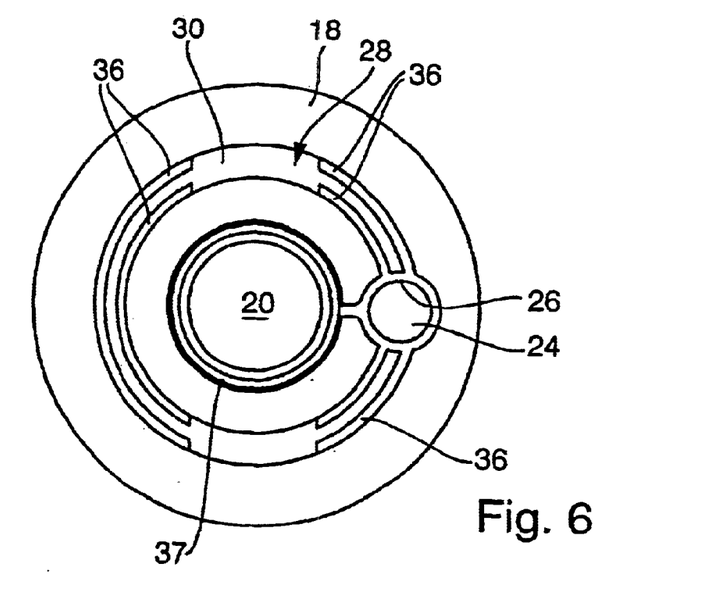

According to FIG. 6, several sections of the ramp 28 may be equipped with the guide contours 36 on the inside radially and on the outside radially. Likewise, an embodiment in which the guide contours 36 extend along the entire length of the ramp is also possible.

The radial guidance of the pin 25 through the interaction of the guide contours 36 with the projection 39 is supported by the spring elastic web 34.

In the embodiment according to FIG. 4, the ends of the guide contours 36 facing away from the opening 26 in the discharge channel 24 are designed as inlet flanks 42, so that a radial alignment or centering with respect to the contact zone 30 of the ramp 28 is achieved in the sliding of pin 25.

Figure 7:
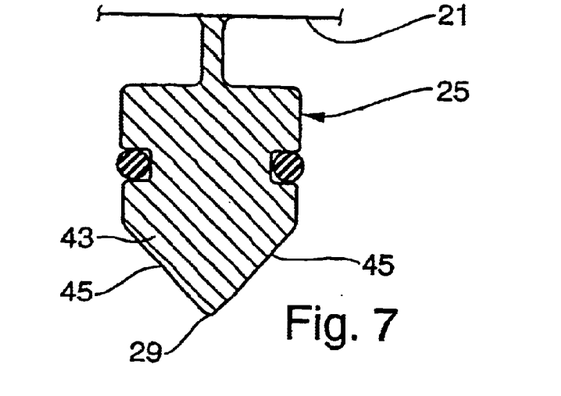
Figure 8:
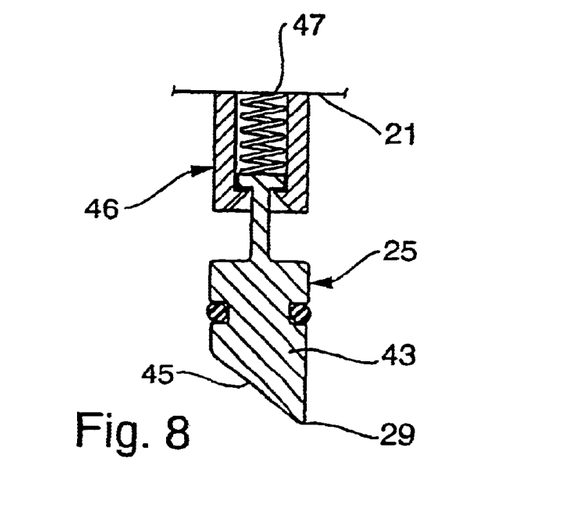

FIGS. 7 and 8 illustrate two alternative embodiments of the design of pin 25 and also FIG. 8 shows an alternative connection of pin 25 to the lower end disk 21. In these alternative embodiments, on its axially free end facing away from the lower end disk 21, the pin 25 is equipped with an end section 43 which tapers toward the axial end. This end section 43 has at least one tapered or rounded flank 45. The length of this flank 45 and the axial extent of the end section 43 are each greater than the diameter of the cross section of the pin on the axial end of the end section 43, as measured in the direction of the distance between the flank 45 and the pin 25. Thus, the tapering end section 43 illustrated in FIGS. 7 and 8 differs significantly from a traditional chamfer 44, which is formed on the pins 25 of the embodiments illustrated in FIGS. 1, 2 and 5, for example.

In the variant according to FIG. 7, the end section 43 is preferably designed so that it tapers to a point, so that contact zone 29 of the pin 25 is designed with a relatively small contact surface, in particular in the form of a spot. Likewise, another possible embodiment is one in which the end section 43 tapers to an edge which also leads to a contact zone 29 with a small contact surface, especially a linear contact zone 29. The alignment of the linear contact zone 29 may expediently run parallel to or across the ramp direction.

The same thing is also true of the variant according to FIG. 8, where the end section 43 also tapers either to a tip or an edge, to form the contact zone 29 of the pin 25. A preferred embodiment here is one in which a linear contact zone 29 which runs across the ramp direction is formed, i.e., the edge-like end of the end section 43 runs essentially radially with respect to the longitudinal axis 14 of the filter 1. The pin 25 is oriented so that the side of the pin 25 which advances when the pin 25 slides along the ramp 28 is provided with the tapered or rounded flank 45.

In the special embodiment illustrated in FIG. 8, the pin 25 is supported so it is adjustable in the axial direction by means of a holder 46 on the lower end disk 21. The holder 46 contains a spring 47, which applies tension to the pin 25, pulling it away from the lower end disk 21, i.e., in the direction of the ramp 28.

The specific embodiments of FIGS. 7 and 8 should make it possible for the pin 25 to overcome any obstacle that might be present on the ramp 28, such as soiling or deposits. As an alternative, instead of the pin 25 mounted on the lower end disk 21, the complete ring-shaped filter insert 9 may be mounted in an axially adjustable manner on the cover 4 of the filter housing 2. For example, in the embodiment according to FIG. 1, the connection between the ring-shaped filter insert 9 and the cover 4 may already be designed so that there is axial play between the ring-shaped filter insert 9 and the cover 4. To produce an axial prestress on the pin 25 or the ring-shaped filter insert 9 in the direction of the ramp 28, spring means 48 may also be provided, in which case they are supported on the upper end disk 17 on the one hand and on the cover 4 on the other hand (see FIG. 1).

Figure 9:
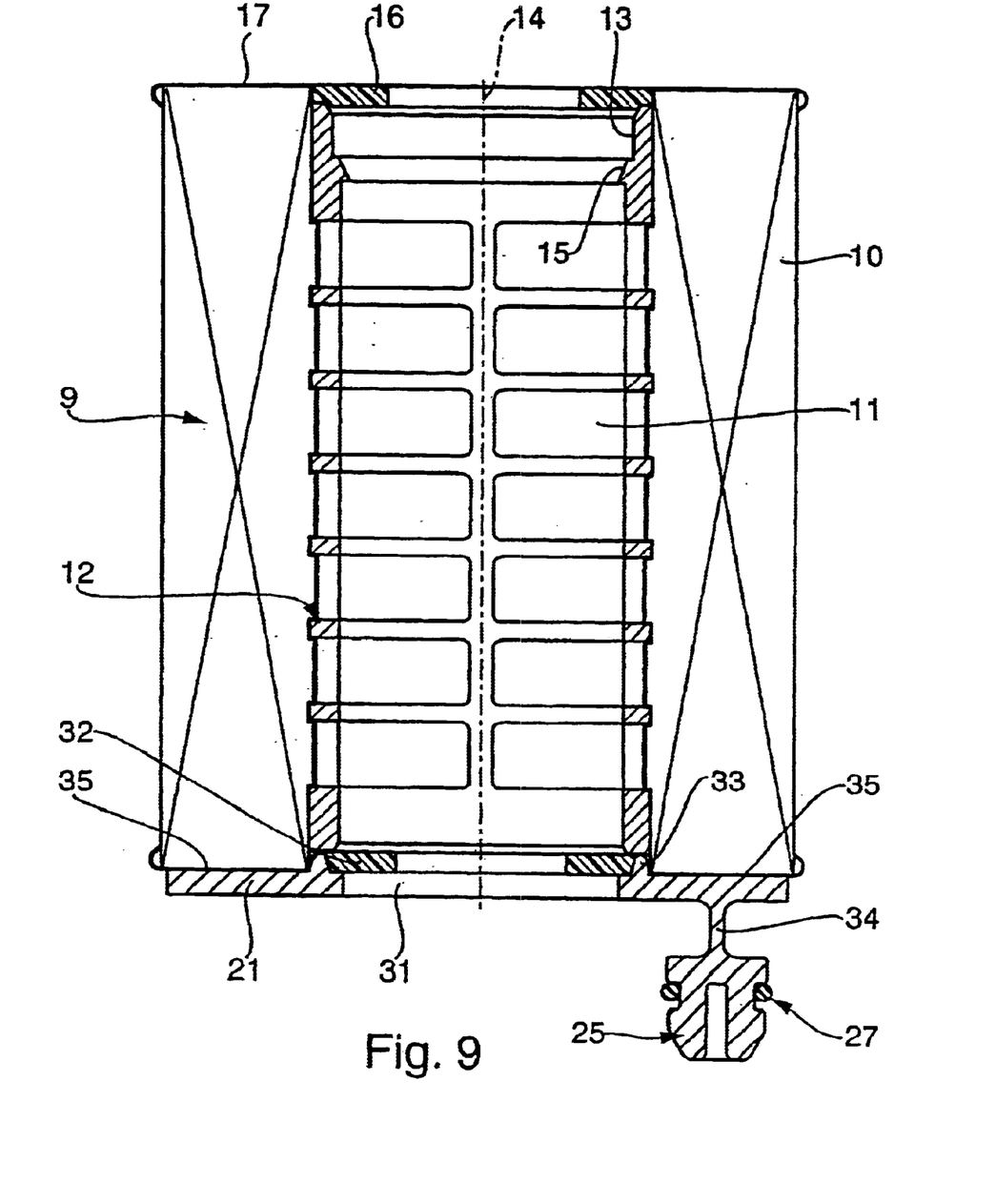

In a preferred embodiment according to FIG. 9, the upper end disk 17 is formed by a nonwoven, which is welded onto or plastified with the upper axial end of the filter material 10. The nonwoven material is unchanged in the area adjacent to the filter material 10 on the inside radially, forming gasket 16 there which projects radially inward through a central orifice in the ring-shaped filter insert 9 as long as the ring-shaped filter insert 9 is not placed on the cover 4. In contrast with the embodiment illustrated in FIG. 1, the variant illustrated in FIG. 9 does not have any connection 22 projecting axially downward, but instead is equipped with a central opening 31. Accordingly, a connection (see connection 37 in FIG. 3) projecting axially from the bottom 18 of the receiving area 3 is inserted into this central orifice to establish the connection of the interior space 11 to the outlet 20. Here again, appropriate sealing means 32 which act radially are also provided. In the embodiment illustrated in FIG. 9, a nonwoven disk 35 is placed on the lower axial end of the filter material 10 for mounting the gasket 32 as done with the upper end disk 17 and is bonded to it by plastification. A part of the nonwoven disk 35 which projects radially inward beyond the filter material 10 then forms the gasket 32. Then the lower end disk 21 is placed on this nonwoven disk 35 or is welded to it. The lower end disk 21 may be bonded to the inner frame 12 at the same time by a ring shoulder 33 which projects axially inward.

The pin 25 is manufactured in one piece with the lower end disk 21. To compensate for tolerances in position with regard to the radial positioning of the pin 25 and with regard to the radial positioning of the orifice 26 of the discharge channel 24, the pin 25 is mounted in a radially flexible manner on the lower end disk 21. In the embodiment shown here, this radial flexibility is achieved by means of a web 34 which is designed with a relatively thin wall radially and extends essentially in the circumferential direction of the ring-shaped filter insert 9. This measure yields a flexibility of the pin 25, which permits a compensation of tolerance in the radial direction.

Figure 10:
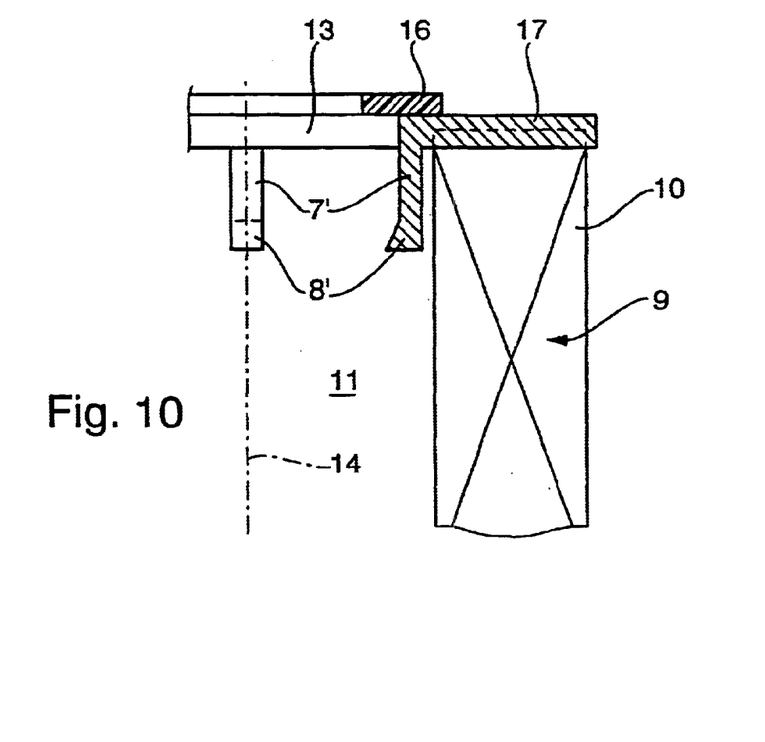

According to FIG. 10, in an alternative embodiment, the upper end disk 17 may be manufactured by conventional means, so that the gasket 16 is attached as a separate part to the upper end disk 17. In the embodiment illustrated in FIG. 10, the catch hooks 7' with their catch noses 8' are designed in one piece with the upper end disk 17, with the catch hooks 7' extending axially into the interior space 11 of the ring-shaped filter insert 9. The ring-shaped collar 13 is formed here by the inside edge of the upper end disk 17. It is clear that with such an embodiment, the holder 5 of the cover 4 is designed like a sleeve and has a ring-shaped shoulder projecting radially outward, working together with the catch hooks 7' and/or their catch noses 8'.

Figure 11:
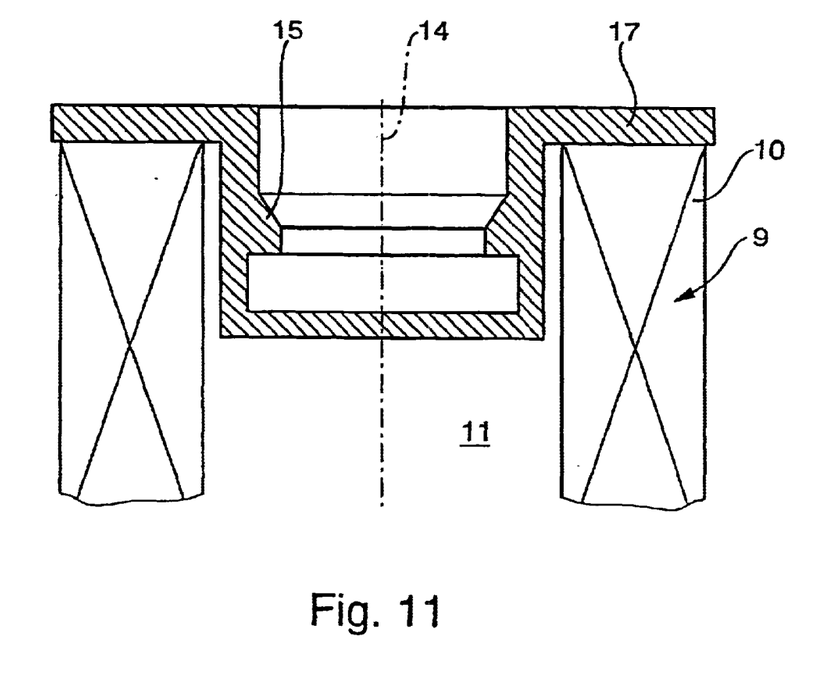

According to FIG. 11, the upper end disk 17 may also be manufactured in a closed design, so that no gasket is necessary.

What is claimed is:

1. A liquid filter, especially an oil filter, for cleaning lubricating oil, especially for internal combustion engines in motor vehicles, having a ring-shaped filter insert (9), and a filter housing (2) which is arranged essentially upright in the installed state and includes a receiving area (3) for receiving the ring-shaped filter insert (9) inserted into it for filtering a liquid, having an inlet (19) for unclean liquid, having an outlet (20) for cleaned liquid, having an additional discharge channel (24) which is released by removal of the ring-shaped filter insert (9) and leads out of the receiving area (3) on a bottom (18) of the receiving area (3), whereby a pin (25) that projects eccentrically and runs parallel to the longitudinal axis (14) of the ring-shaped filter insert (9), and is integrally molded on a lower end disk (21) of the ring-shaped filter insert (9) and penetrates into an opening (26) in the discharge channel (24) and seals it when the ring-shaped filter insert (9) is inserted into the filter housing (2), characterized in that a ramp (28) is formed on the bottom (18) of the receiving area (3), beginning with a lower end at the opening (26) in the discharge channel (24) in the bottom (18) and rising into the interior space of the receiving area (3) with an increase in the ramp length, the ring-shaped filter insert (9) is adapted to the filter housing (2) so that the ring-shaped filter insert (9) can rotate freely about its longitudinal axis (14) in the receiving area (3) as long as the pin (25) does not engage in the opening (26) in the discharge channel (24), the ramp (28) and the pin (25) are coordinated with regard to positioning and interacting contact zones (29, 30) so that when the ring-shaped filter insert (9) is inserted into the filter housing (2), the pin (25) rests with its contact zone (29) on the contact zone (30) of the ramp (28)—as long as the pin has not yet penetrated into the opening (26) in the discharge channel (24)—and it slides downward with the rotation of the ring-shaped filter insert (9), penetrating into the opening (26) in the discharge channel (24) at the lower end of the ramp (28).

2. A liquid filter according to claim 1, characterized in that the ramp (28) is designed with a helical pattern.

3. A liquid filter according to claim 2, characterized in that the helical ramp (28) has an essentially complete turn, so an upper end of the ramp (28) is adjacent to the opening (26) in the discharge channel (24).

4. A liquid filter according to claim 2, characterized in that the filter housing (2) has a cover (4) which can be screwed onto the filter housing (2) to seal it, the ramp (28) drops toward the opening (26) in the discharge channel (24) in the direction of screwing on the cover (4).

5. A liquid filter according to claim 1, characterized in that at least one guide contour (36) is formed in at least one section of the ramp (28) containing the lower end of the ramp (28) and located radially next to the contact zone (30) of the ramp (28), and this guide contour projects axially beyond the contact zone (30) of the ramp (28) toward the receiving area (3).

6. A liquid filter according to claim 5, characterized in that two radially opposite guide contours (36) are provided, with the contact zone (30) of the ramp (28) running between them.

7. A liquid filter according to claim 5, characterized in that the guide contours (36) have an insertion flank (42) on one end facing away from the opening (26) in the discharge channel (24).

8. A liquid filter according to claim 5, characterized in that several ramp sections having one or two parallel guide contours (36) are provided along the length of the ramp.

9. A liquid filter according to claim 1, characterized in that a projection (39) extending axially away from the pin (25) is formed on an end (38) of the pin (25) facing the ramp (38), its axially free end (40) forming the contact zone (29) of the pin (25).

10. A liquid filter according to claim 9, characterized in that two radially opposite guide contours (36) are formed in at least one section of the ramp (28) containing the lower end of the ramp with the contact zone (30) of the ramp (28) running between them, and the projection (39) is thinner in the radial direction than the radial distance between the two radially opposed guide contours (36).

11. A liquid filter according to claim 9, characterized in that two radially opposite guide contours (36) are formed in at least one section of the ramp (28) containing the lower end of the ramp with the contact zone (30) of the ramp (28) running between them, and the projection (39) is longer in the axial direction than the axial distance between the contact zone (30) of the ramp (28) and an upper end (41) of the guide contours (36).

12. A liquid filter according to claim 1, characterized in that the contact zone (30) of the ramp (28) is wider in the radial direction than the contact zone (29) of the pin (25).

13. A liquid filter according to claim 1, characterized in that the pin (25) is mounted on the lower end disk (21) in a radially flexible manner.

14. A liquid filter according to claim 1, characterized in that a tapering end section (43) formed on the axially free end of the pin (35) has the contact zone (29) of the pin (25).

15. A liquid filter according to claim 1, characterized in that the contact zone (29) of the pin (25) is designed as a spot or a line.

16. A liquid filter according to claim 1, characterized in that the pin (25) has a rounded or inclined flank (45) on its axially free end on the side which leads when the pin (25) slides along the ramp (28).

17. A liquid filter according to claim 1, characterized in that the pin (25) is mounted so it is axially adjustable on the lower end disk (21) and/or the ring-shaped filter insert (9) is axially adjustable on the cover (4).

18. A liquid filter according to claim 17, characterized in that spring means (47, 48) are provided which apply tension to the pin (25) and/or the ring-shaped filter insert (9) in the direction of the ramp (28).

19. A liquid filter according to claim 1, characterized in that the filter housing (2) can be sealed with a screw-on cover (4), retaining means (5, 7, 8, 15) are provided with which the ring-shaped filter insert (9) can be mounted on the cover (4) so it can rotate about its longitudinal axis (14) and is secured axially, the retaining means have catch hooks (7) which extend essentially axially and have a radial flexibility, the retaining means have a radially projecting ring-shaped shoulder (15) on which the catch hooks (7) engage when the ring-shaped filter insert (9) is placed on the cover (4), an upper end disk (17) has a central orifice on whose edge are arranged a gasket (16) and a ring-shaped collar (13), a central ring (6) mounted on the cover (4) is arranged coaxially with the ring-shaped collar (13) when the ring-shaped filter insert (9) is placed on the cover (4), and the gasket (16) forms a seal radially between the ring (6) and the ring-shaped collar (13).

20. A liquid filter according to claim 19, characterized in that the elements of the retaining means arranged on the ring-shaped filter insert (9) are designed axially and radially in the interior space (11) of the ring-shaped filter insert (9).

21. A liquid filter according to claim 19, characterized in that the elements of the retaining means arranged on the ring-shaped filter insert (9) are designed on an inner frame (12) of the ring-shaped filter insert (9).

22. A liquid filter according to claim 21, characterized in that the elements of the retaining means arranged on the ring-shaped filter insert (9) are manufactured in one piece with the inner frame (12).

23. A liquid filter according to claim 19, characterized in that the elements of the retaining means arranged on the ring-shaped filter insert (9) are formed on the upper end disk (17) of the ring-shaped filter insert (9).

24. A liquid filter according to claim 23, characterized in that the elements of the retaining means arranged on the ring-shaped filter insert (9) are manufactured in one piece with the upper end disk (17).

* * * * *